United States Patent [19]

Hayashi et al.

[11] Patent Number: 4,871,993

[45] Date of Patent: Oct. 3, 1989

[54] SELF-DIAGNOSTIC APPARATUS FOR VEHICLE METER

[75] Inventors: Takatoshi Hayashi, Kawasaki; Norio Fujiki, Yokohama; Yoichiro Tanaka; Takashi Nishimoto, both of Tokyo; Masakazu Kobayashi, Saitama, all of Japan

[73] Assignees: Kanto Seiki Co., Ltd., Ohmiya; Nissan Motor Co., Ltd., Yokohama, both of Japan

[21] Appl. No.: 214,071

[22] Filed: Jul. 1, 1988

[30] Foreign Application Priority Data

Jul. 3, 1987 [JP] Japan ................................ 62-165485

[51] Int. Cl.$^4$ ..................... B60Q 1/00; G01R 11/32
[52] U.S. Cl. ..................... 340/439; 340/444; 340/461; 340/635; 340/653; 340/688; 340/515; 324/74; 73/1 R; 73/2
[58] Field of Search .................. 340/52 R, 637, 653, 340/688, 515, 635, 439, 444, 461; 324/74, 75, 115; 73/1 R, 2

[56] References Cited

U.S. PATENT DOCUMENTS

| | | | |
|---|---|---|---|
| 3,761,812 | 9/1973 | Plake | 324/74 |
| 4,646,003 | 2/1987 | Phillips et al. | 324/74 |

FOREIGN PATENT DOCUMENTS

| | | | |
|---|---|---|---|
| 55-64773 | 5/1980 | Japan . | |
| 0084567 | 4/1986 | Japan | 73/2 |
| 61-123749 | 6/1986 | Japan . | |
| 62-282272 | 12/1987 | Japan . | |

Primary Examiner—Donnie L. Crosland
Attorney, Agent, or Firm—Foley & Lardner, Schwartz, Jeffery, Schwaab, Mack, Blumenthal & Evans

[57] ABSTRACT

To prevent the driver from being confused by the fact that a pseudo vehicle speed to diagnose a vehicle speed meter is indicated when a vehicle speed sensor is disconnected by an accident during vehicle travelling, a pseudo vehicle speed sensor signal is applied to the vehicle speed meter only when the vehicle speed sensor is disconnected from the vehicle speed meter and the disconnected sensor is reconnected to the meter a predetermined time period after the sensor has been disconnected from the meter. The self-diagnostic apparatus is composed of counters, flip-flops and logical gates, and is reset whenever an ignition switch is turned on.

6 Claims, 7 Drawing Sheets

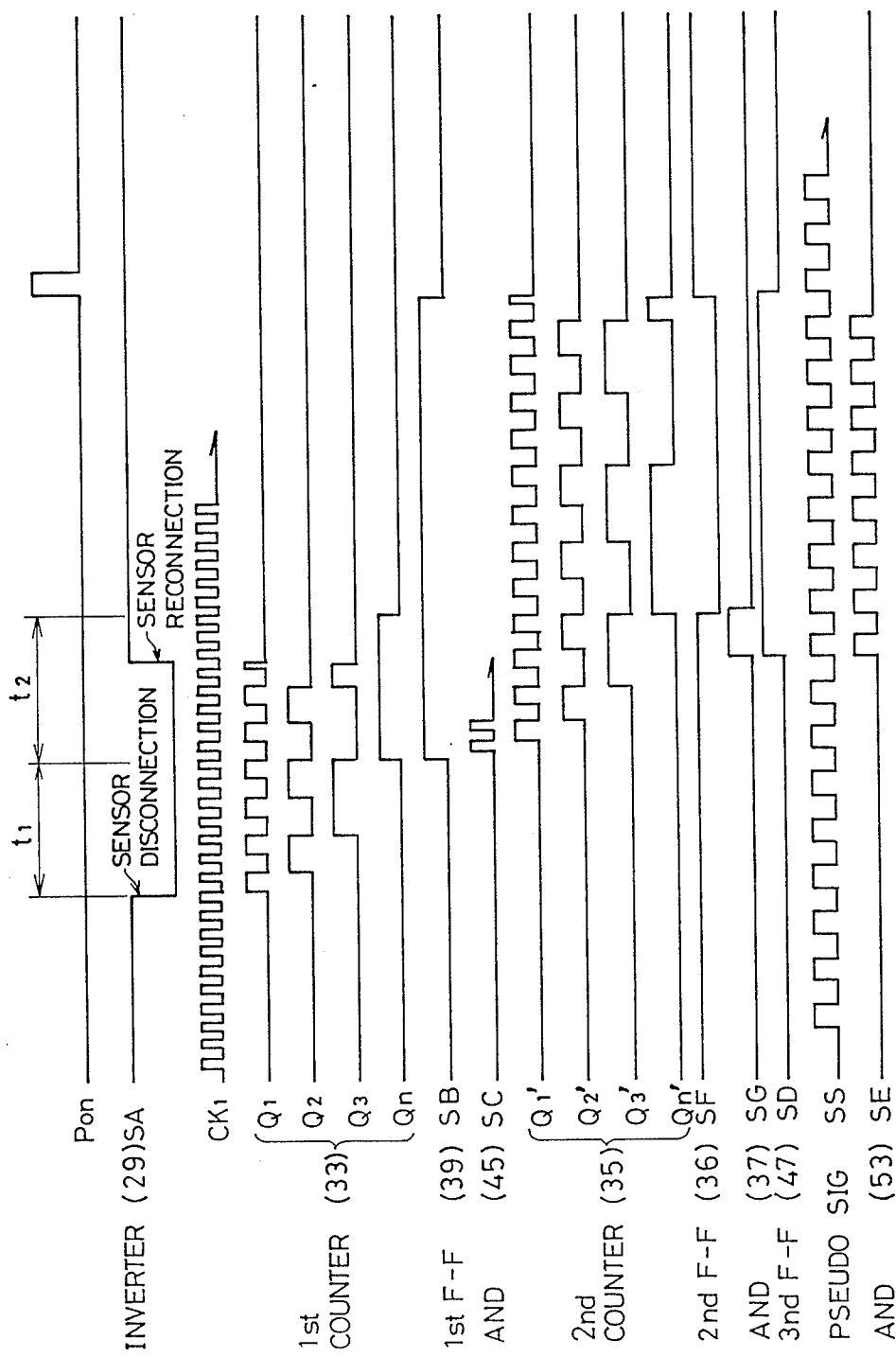

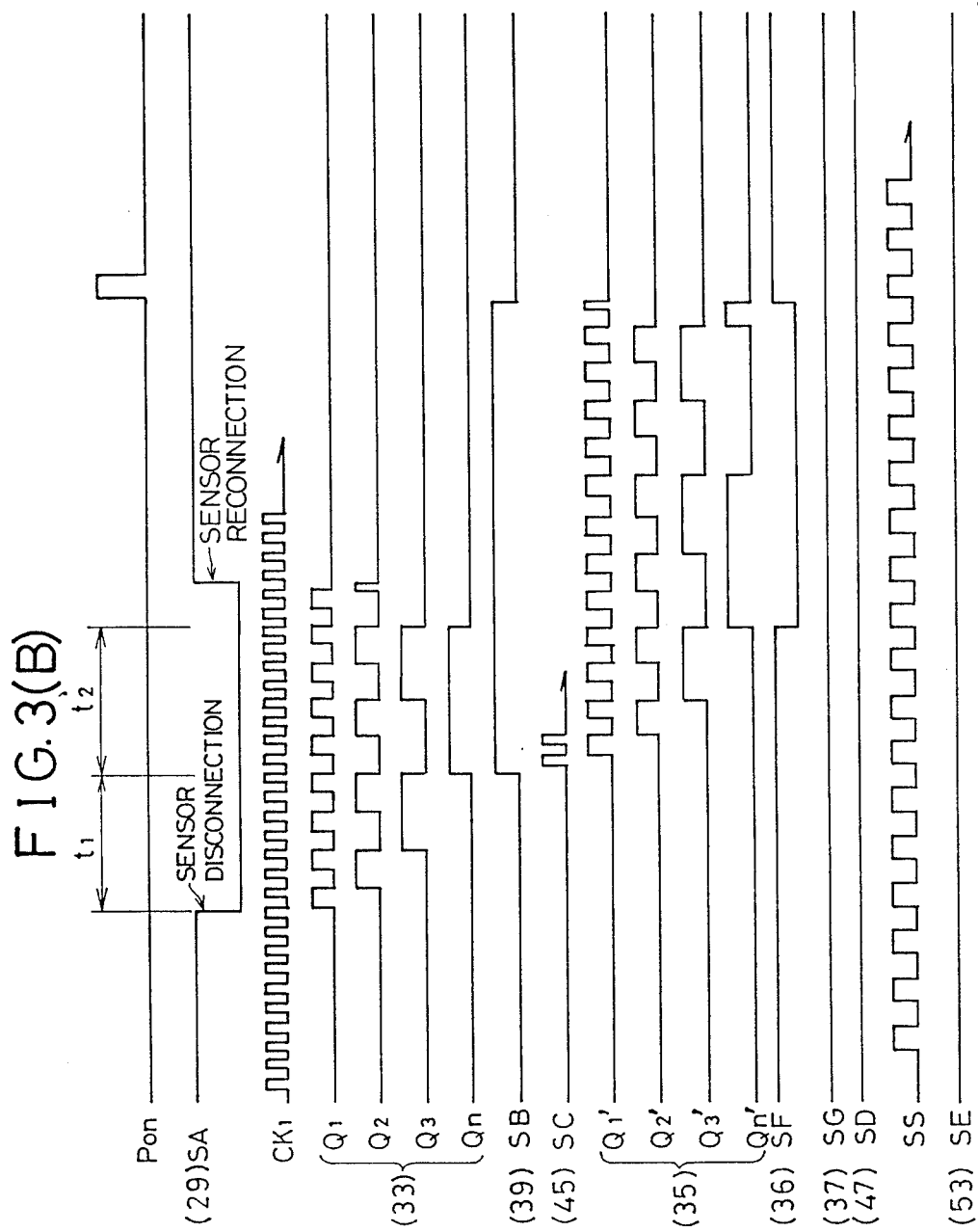

SELF-DIAGNOSTIC APPARATUS FOR VEHICLE METER

BACKGROUND OF THE INVENTION

1. Field of the Invention

The present invention relates generally to a self-diagnostic apparatus for diagnosing a meter mounted on an automotive vehicle, and more specifically to a self-diagnostic apparatus for diagnosing a vehicle meter (e.g. vehicle speed meter) actuated in response to a measurement signal detected by a vehicle sensor (e.g. vehicle speed sensor).

2. Description of the Prior Art

An example of prior-art speed meters mounted on an automotive vehicle is disclosed in Japanese Published Unexamined (Kokai) Utility Model Appli. No. 55-64773 for instance, which comprises a waveform shaper, an F-V converter, a cross coil meter, etc. That is, a vehicle speed pulse signal detected by a vehicle speed sensor is first waveform shaped and then converted into a voltage signal through the F-V converter. The converted voltage signal is applied to a cross coil composed of a pair of coils disposed a predetermined angular distance away from each other, to energize the cross coil, so that a movable magnet is rotated by the magnetic field generated by the cross coil. Vehicle speeds can be indicated by a needle fixed to the movable magnet on the basis of the angular position of the needle. To diagnose the vehicle speed meter as described above, Japanese Patent Appli. No. 61-123749 discloses the following method: a pseudo vehicle speed signal is applied to the vehicle speed meter, in place of an actual vehicle speed signal detected by the vehicle speed sensor, to confirm that a predetermined vehicle speed value can be indicated on the vehicle meter in response to the applied pseudo vehicle speed signal.

FIG. 1 shows a self-diagnosis apparatus disclosed in the above prior-art patent application, which comprises a vehicle speed sensor 1, a cross coil meter 3, an operational amplifier 5, a cross coil driver 7, a self-diagnose starter 9, a pseudo speed generator 11, etc. In operation, a vehicle speed signal detected by the vehicle sensor 1 is supplied to the cross coil meter 3 via the operational amplifier 5 and the cross coil driver 7. In self-diagnosis, a pseudo vehicle speed signal is generated from the pseudo vehicle speed signal generator 11. This signal generator 11 is activated by the self-diagnose starter when a diagnose switch 13 is turned on or the vehicle sensor 1 is disconnected. The generated pseudo vehicle speed signal is amplified by the operational amplifier 5 and then supplied to the cross coil meter 3 via the cross coil drive 7. On the basis of ths pseudo vehicle speed signal, the cross coil meter can be diagnosed by confirming whether a predetermined speed value can be indicated on the meter in response to the generated pseudo vehicle speed signal.

In the prior-art self-diagnose apparatus for a vehicle meter, however, there exists a problem in that in case the vehicle sensor 1 is disconnected by an accident during actual vehicle travelling, a vehicle speed determined on the basis of the pseudo vehicle speed sensor signal (which is different from an actual vehicle speed) is indicated, because a self-diagnosis mode is set when the vehicle speed sensor 1 is disconnected. The above vehicle speed indicated in response to the pseudo vehicle speed signal will result in driver's confusion.

In addition, in the prior-art self-diagnose apparatus for a vehicle meter, since the vehicle speed meter is often inspected in vehicle assembly process in the factor by disconnecting the vehicle sensor 1 from the meter to generate a pseudo vehicle speed signal, there exists another problem in that the inspector often forgets reconnecting the disconnected vehicle sensor to the meter after inspection.

SUMMARY OF THE INVENTION

With these problems in mind, therefore, it is the primary object of the present invention to provide a self-diagnosis apparatus for a vehicle meter which will not disturb the driver even if a vehicle sensor is disconnected from the vehicle meter by an accident during actual vehicle travelling.

To achieve the above-mentioned object, the self-diagnose apparatus for diagnosing a meter actuated by a sensor signal from a sensor mounted on an automotive vehicle, according to the present invention, comprise:

(a) detecting unit for detecting a first sensor signal;

(b) time measuring unit, coupled to said detecting unit, for measuring a predetermined time period after said detecting unit has detected the first sensor signal; and (c) pseudo signal generating unit, coupled to said detecting unit and said time measuring unit, for generating a pseudo sensor signal to diagnose the meter only when said detecting unit detects a second sensor signal different from the first sensor signal after said time measuring unit has measured the predetermined time period.

The first sensor signal is generated when the sensor is disconnected from the meter. The second sensor signal is generated when the sensor is reconnected to the meter or when a dc voltage is applied to the meter. Further, it is also possible to incorporate counter unit for generating the second sensor signal when an ignition switch is turned on or off repeatedly by a predetermined number of times or when the meter is shorted repeatedly by a predetermined number of times.

Further, it is preferable to incorporate another time measuring unit for measuring another predetermined time period after the time measuring means has measured the predetermined time period. In this case, the pseudo sensor signal to diagnose the meter is generated only when the detecting unit detects the second sensor signal after the time measuring unit has measured the predetermined time period but before another time measuring unit does not measure another predetermined time period.

In the self-diagnostic apparatus, since a pseudo vehicle sensor signal is applied to the vehicle meter only when the vehicle sensor is disconnected from the vehicle meter and the disconnected sensor is reconnected to the meter a predetermined time period after the sensor has been disconnected from the meter, it is possible to prevent the driver from being confused by a pseudo sensor value indicated on the meter in response to the pseudo sensor signal generated by an accident during vehicle travelling.

BACKGROUND OF THE INVENTION

Figure 1:
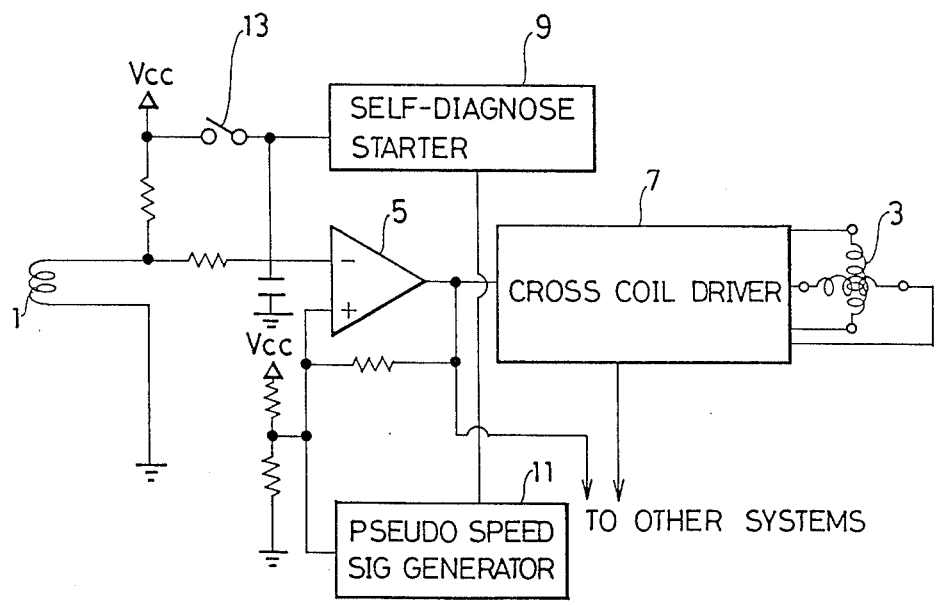
FIG. 1 is a circuit diagram showing a prior-art self-diagnostic apparatus for a vehicle meter.
Figure 2:
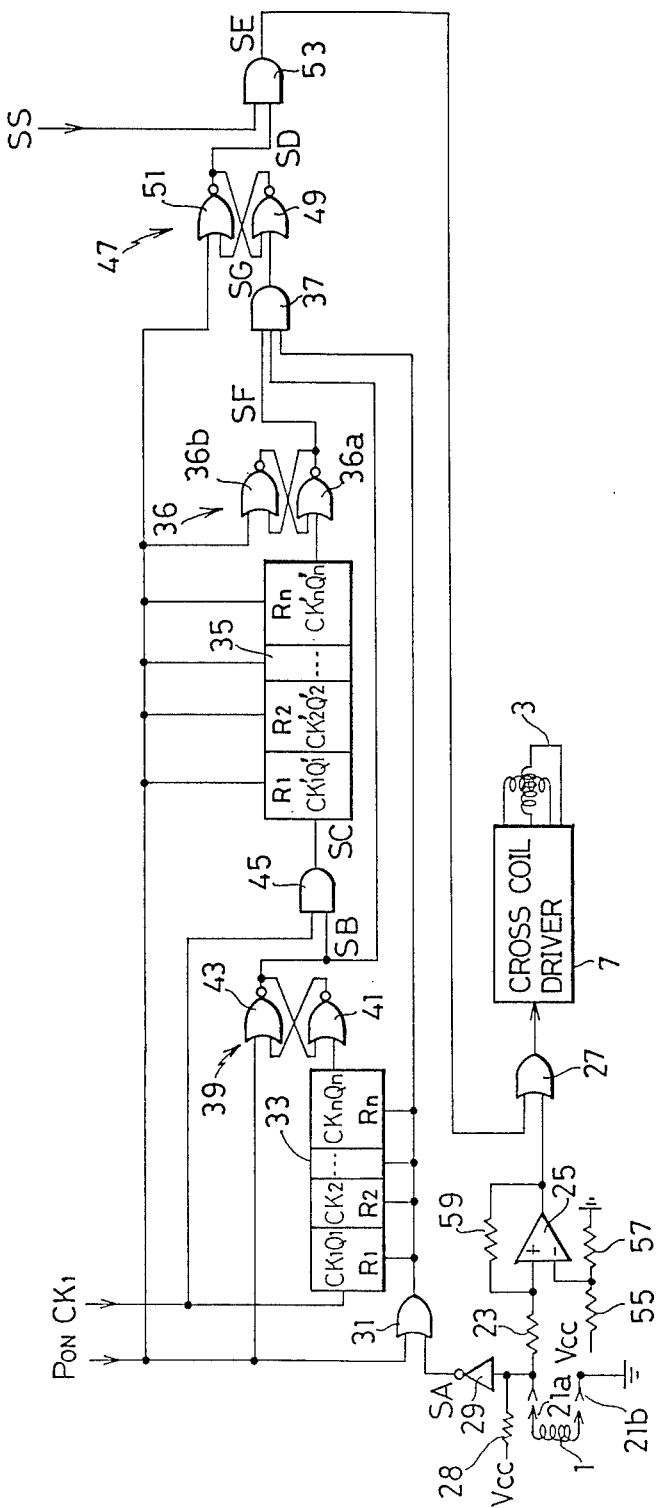
FIG. 2 is a block diagram showing a first embodiment of the self-diagnosis apparatus according to the present invention.
Figure 4:
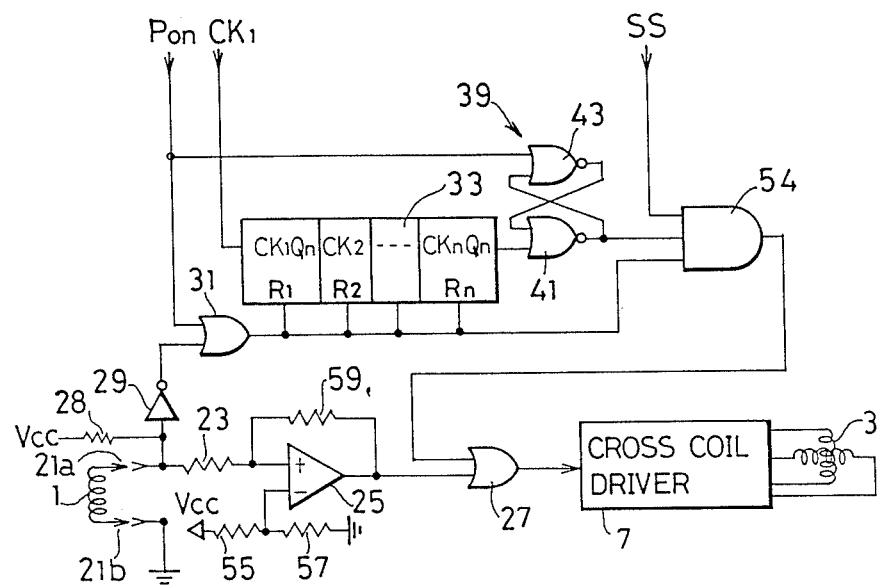
Figure 5:
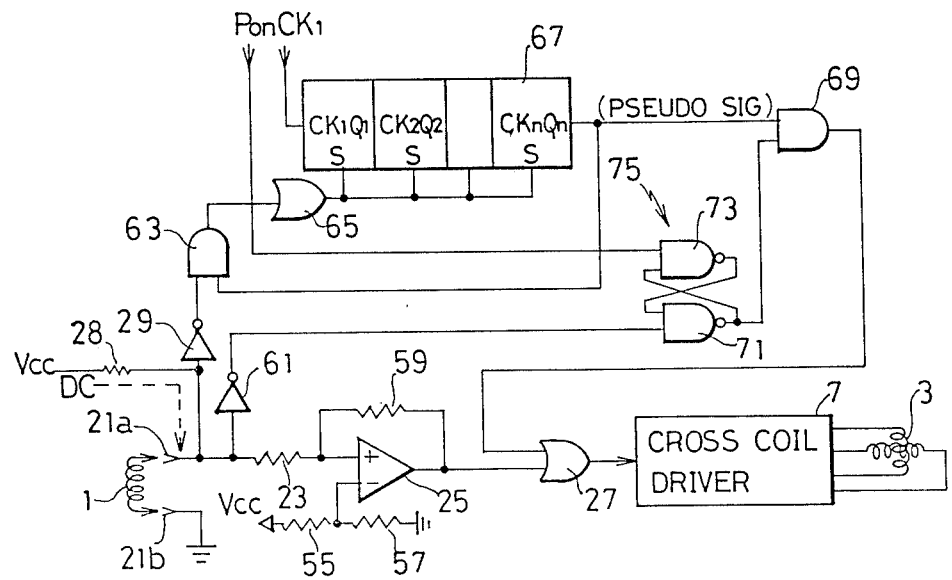
Figure 6:
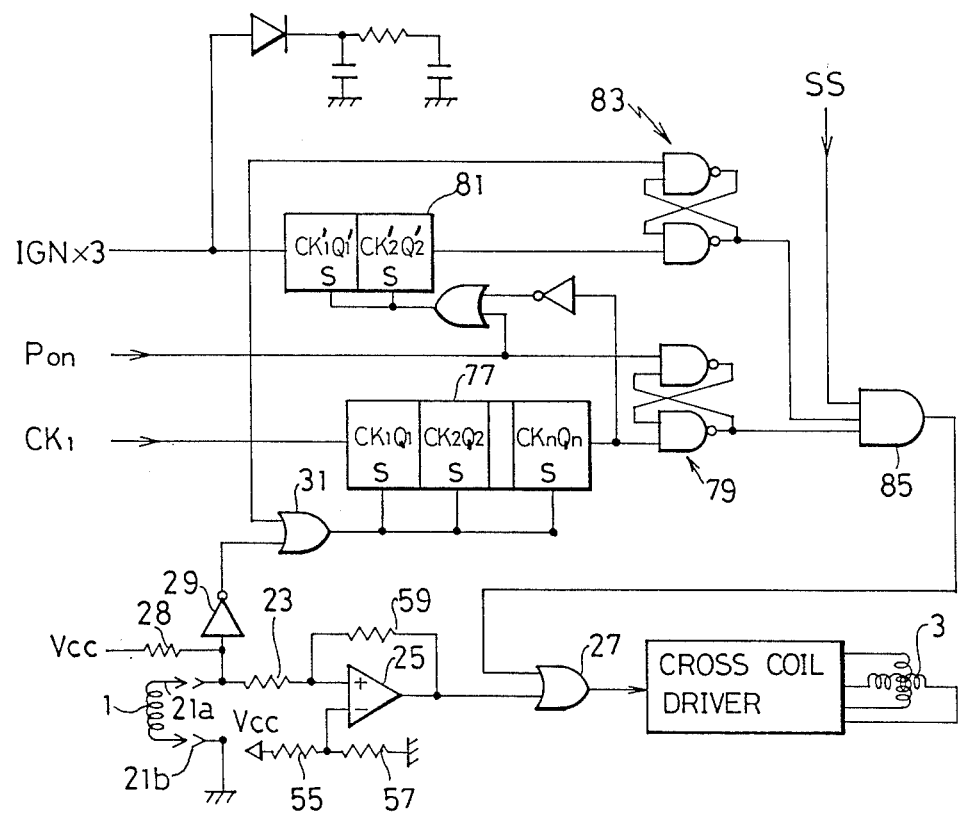
Figure 7:
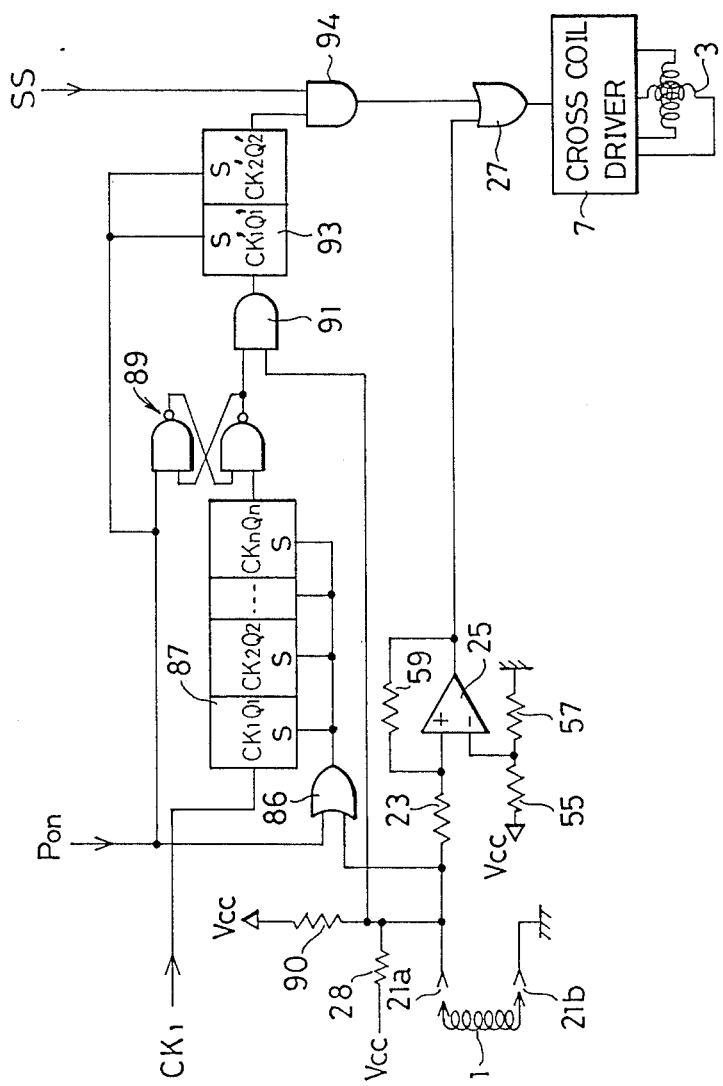

FIGS. 3(A) and (B) are timing charts for assistance in explaining operations at various positions in the apparatus shown in FIG. 2;

FIG. 4 is a block diagram showing a second embodiment of the self-diagnosis apparatus according to the present invention;

FIG. 5 is a block diagram showing a third embodiment of the self-diagnostic apparatus according to the present invention;

FIG. 6 is a block diagram showing a fourth embodiment of the self-diagnosis apparatus according to the present invention; and FIG. 7 is a block diagram showing a fifth embodiment of the self-diagnostic apparatus according to the present invention.

DETAILED DESCRIPTION OF THE PREFERRED EMBODIMENTS

A first embodiment of the apparatus of the present invention will be described with reference to FIG. 2. A vehicle meter shown in FIG. 2 comprises a vehicle speed sensor 1; a comparator 25; an OR gate 27; a cross coil driver 7; and a cross coil meter 3. A vehicle speed signal detected by the vehicle speed sensor 1 is compared with a predetermined time level by the comparator 25 and then applied to the cross coil meter 3 via the OR gate 27 and the cross coil driver 7 to indicate the detected vehicle speed.

In the above comparator 25 having a feed back resistor 59 connected between the output and a non-inversion input terminal thereof, an inversion input terminal (−) thereof is connected to a junction point of a voltage divider composed of two resistors 55 and 57 connected in series between a supply voltage $V_{cc}$ and ground, while a non-inversion input terminal (+) thereof is connected to the speed sensor 1. A vehicle speed pulse signal detected by the vehicle speed sensor 1 is supplied to the non-inversion input terminal (+) via the resistor 23, compared with this divided reference voltage, and waveform-shaped as a pulse signal whose frequency is proportional to the vehicle speed, before being supplied via the OR gate 27 to the cross coil driver 7. The cross coil driver 7 detects the vehicle speed by counting the number of the pulses and generates a voltage signal according to the counted vehicle speed. This voltage signal energizes two coils disposed at predetermined angular intervals in the cross coil meter 3 to rotate a movable magnet for providing a vehicle speed indication.

The vehicle speed sensor 1 is connected to the above-mentioned meter circuit and a self-diagnostic circuit via two connector terminals 21a and 21b. The first connector terminal 21a is connected to the comparator 25 via a resistor 23 and to the self-diagnostic circuit via an inverter 29; while the second connector terminal 21b is grounded. Further, a supply voltage $V_{cc}$ is supplied to an input terminal of the inverter 29 via a resistor 28.

In this first embodiment, only when the vehicle speed sensor 1 is disconnected from the connector terminals 21a and 21b and then reconnected thereto after a first predetermined time has elapsed but before a second predetermined will elapse, a pseudo vehicle speed signal SS is applied to the cross coil meter 3 via the OR gate 27 and the cross coil driver 7 in order to diagnose the cross coil meter 3. After diagnosis in response to the pseudo vehicle speed signal SS, the self-diagnostic circuit is reset in response to an ignition switch signal so that the meter 3 can indicate actual vehicle speeds detected by the vehicle speed sensor 1.

The self-diagnostic circuit shown in FIG. 2 comprises an inverter 29, an OR gate 31, a first counter 33, a first flip-flop 39, an AND gate 45, a second counter 35, a second flip-flop 36, an AND gate 37, a third flip-flop 47, an AND gate 53, etc.

An output signal SA of the inverter 29 is applied to one input of the OR gate 31, and a power-on reset signal $P_{on}$ (generated when an ignition switch is turned on) is applied to the other input of the OR gate 31. As described later, the counters or flip-flops are all reset in response to this power-on reset signal $P_{on}$.

The output of the OR gate 31 is connected to the reset terminals of the first counter 33 and to an input of the AND gate 37. To the other inputs of this AND gate 37, an output SB of the first flip-flop 39 and an output SF of the second flip-flop 36 are applied.

A reference clock signal CK1 is given to a clock input of the first counter 33. This first counter 33 counts this reference clock signal CK1 and outputs a high voltage level output signal from the n-th stage output $Q_n$ thereof to an input of a NOR gate 41 forming the first flip-flop 38 when a predetermined number of the clock signals (indicative of a predetermined time period $t_1$) are inputted to the first counter 33. The power-on reset signal $P_{on}$ is also supplied to an input of the other NOR gate 43 forming the first flip-flop 39. The output signsl SB of the first flip-flop 39 is given to one input of the AND gate 45 and the reference clock signal CK1 is applied to the other input of the AND gate 45. An output signal SC of this AND gate 45 is applied to the second counter 35 as the reference clock signal.

The power-on reset signal $P_{on}$ is also applied to all reset terminals of the second counter 35. An n-th stage output $Q_n'$ of the second counter 35 is connected to one input of one NOR gate 36a forming the second flip-flop 35. An output signal of the NOR gate 36a is applied to one input of the AND gate 37. The power-on reset signal $P_{on}$ is applied to one input of the other NOR gate 36b forming the second flip-flop 36, so that this second flip-flop 36 can be reset in response to this power-n reset signal $P_{on}$.

An output SG of the AND gate 37 is connected to one input of one NOR gate 49 forming the third flip-flop 47, and the power-on reset signal $P_{on}$ is applied to one input of the other NOR gate 51 forming the same third flip-flop 37. An output signal SD of the flip-flop 37 is given to one input of the AND gate 53, and a pseudo vehicle speed signal SS is given to the other input of the AND gate 53. The output of this AND gate 53 is connected to the other input of the OR gate 27.

The operation of the self-diagnostic circuit shown in FIG. 2 will be described in detail with reference to the timing charts shown in FIGS. 3(A) and (B).

(1) When the vehicle speed sensor is once disconnected and then connected again normally within a predetermined time period $(t_1 + t_2)$ (FIG. 3A):

To diagnose the vehicle speed sensor in the factory, an inspector first disconnects the vehicle speed sensor 1 from the meter by the connector terminals 21a and 21b and then reconnects the vehicle speed sensor 1 within a predetermined time period $(t_1 + t_2)$. Under these conditions, a pseudo vehicle speed signal SS is applied to the cross coil meter 3 in order to inspect the cross coil meter 3 on the basis of this pseudo signal. Therefore, since no pseudo vehicle speed SS is applied to the meter 3 even if the vehicle speed sensor 1 is disconnected due to an accident during vehicle traveling, the driver will not be confused.

In more detail, all the flip-flops and the counters are reset (initialized) in response to a power-on reset signal $P_{on}$ (when an ignition switch is turned on). When the meter 3 is required to be inspected in the factory, since the vehicle speed is zero and the vehicle sensor 1 is connected to the meter 3 via the connector terminals 21a and 21b, the output signal SA of the inverter 29 is at a high level as shown in FIG. 3(A). Since this high level signal is applied to the reset terminals of the first counter 33 via the OR gate 31, the first counter 33 is kept reset. This high level signal is also applied to an input of the AND gate 37. Under these conditions, the reference clock signal CK1 and the pseudo vehicle speed signal SS as shown in FIG. 3(A) are supplied to the self-diagnostic circuit. Further, in this initialized condition, the output SF of the second flip-flop 36 is at a high level.

Under these conditions, when the vehicle sensor 1 is disconnected from the meter by the connector terminals 21a and 21b to diagnose the meter 3, since the output SA of the inverter 29 changes to a low level, the reset signals applied to the first counter 33 is removed. As a result, the first counter 33 starts counting the reference clock signal CK1. When the first counter 33 counts a first predetermined number of clocks ($t_1$) (e.g. after 6 seconds), since the output $Q_n$ changes to a high level, the first flip-flop 39 is set, so that the output SB thereof changes to a high level. This high level signal SB of the first flip-flop 39 is applied to the AND gate 45 to apply the reference clock signal CK1 to the second counter 35, and also to the AND gate 37. Therefore, the second counter 35 starts counting the reference clock signal CK1. When the second counter 35 counts a second predetermined number of clocks ($t_2$) (e.g. after 6 sec), the output $Q_n'$ changes to a high level. Here, when the vehicle sensor 1 is reconnected to the meter 3 by the connector terminals 21a and 21b before $t_2=6$ sec elapses, since the output SA of the inverter 29 changes to a high level again and is applied to the AND gate 37 via the OR gate 31, a high level signal is outputted from the AND gate 37 to set the third flip-flop 47. As a result, since an output signal SD of this third flip-flop 47 gates (activates) the AND gate 53, the pseudo vehicle speed signal SS is supplied to the cross coil driver 7 via the OR gate 27, so that the cross coil meter 3 is activated on the basis of the pseudo vehicle speed signal. The inspector can diagnose the vehicle speed meter 3 on the basis of the indication of the pointer thereof. In summary, in this first embodiment, only when the vehicle sensor 1 is disconnected from the meter by the connectors 21a and 21b and then connected again thereto within a predetermined time period ($t_1+t_2$), a pseudo vehicle speed signal SS can be supplied to the cross coil meter 3 via the cross coil driver 7 for providing diagnostic operation.

Further, when a power-on reset signal $P_{on}$ is supplied again after the above mentioned diagnosis dependent upon the pseudo vehicle speed signal SS, since all the counters and the flip-flops are reset, the apparatus is initialized and therefore vehicle speeds are measured by the vehicle sensor 1 and indicated by the meter 3 under the normal indication conditions.

(2) When the vehicle speed sensor is once disconnected and not connected again abnormally within a predetermined time period (FIG. 3B).

When the time has elapsed beyond the second time period $t_2$, since the second flip-flop 36 can be reset by an output $Q_n'$ of the n-th stage output of the second counter 35, the outputs signal SF of the flip-flop 36 changes to a low level, so that the AND gate 37 is not gated (deactivated) without outputting a pseudo vehicle speed. In other words, when the vehicle speed sensor 1 is kept disconnected erroneously after diagnosis or owing to an accident, since the pseudo vehicle speed signal SS will not be applied to the self-diagnostic apparatus, it is possible to prevent the driver from being confused.

FIG. 4 shows a second embodiment of the apparatus of the present invention, in which the second counter 35 (shown in FIG. 2) and its associated circuit elements are eliminated. In this embodiment, therefore, the predetermined time interval during which the vehicle speed sensor 1 must be disconnected and then reconnected is measured by only the first counter 33. In this case, since the pseudo vehicle speed signal SS can be applied to the cross coil meter 3 only when the sensor 1 is reconnected within a predetermined time period after the sensor 1 has been disconnected, it is possible to diagnose the vehicle speed meter 3 in the same way as in the first embodiment.

FIG. 5 shows a third embodiment of the apparatus of the present invention, in which an output signal of a counter 67 is used as a pseudo vehicle speed signal and this pseudo vehicle speed signal is applied to the vehicle speed meter 3 when the vehicle speed sensor 1 has been disconnected and then a dc bias voltage is applied to the connector terminal 21a.

In more detail, when the vehicle speed sensor 1 is disconnected from the meter by the connector terminals 21a and 21b, since an output of the inverter 29 drops to a low level and is applied to the set terminals of the counter 67 via an AND gate 63 and an OR gate 65, the counter 67 is released from the set mode and begins to count the reference clock signal CK1. Therefore, the counter 67 outputs a pulse signal at predetermined time intervals from the n-th stage outputs thereof as a pseudo vehicle speed signal. This pseudo vehicle speed signal is applied to one input of an AND gate 69.

To diagnose the vehicle speed meter 3 after the vehicle sensor 1 has been disconnected and the counter 67 has outputted a pseudo vehicle speed signal, a dc bias voltage higher than the supply voltage $V_{cc}$ is applied to the connector terminal 21a. As a result, an inverter 61 connected in parallel to the inverter 29 is activated, so that the output thereof changes to a low level. In response to this low level signal, a flip-flop 75 composed of two NAND gates 71 and 73 is set to change the output of the NAND gate 71 to a high level. This high level signal is applied to the other input terminal of the AND gate 69 to output the pseudo vehicle speed signal (a counter output signal) applied to the other input terminal of the AND gate 69. This pseudo vehicle speed signal is supplied for diagnosis to the cross coil meter 3 via the OR gate 27 and the cross coil driver 7.

FIG. 6 shows a fourth embodiment of the apparatus of the present invention, in which the diagnostic operation can be made by turning on the ignition switch three times, for instance within a predetermined time period after the vehicle sensor 1 has been disconnected.

In more detail, when the vehicle sensor 1 is disconnected by the connectors 21a and 21b, since a counter 77 is released from the set mode, the counter 77 begins to count the reference clock signal CK1. When the counter 77 has counted a predetermined number of clock signals CK1, since the output $Q_n$ of the n-th stage output of the counter 77 changes to a low level, a flip-flop 79 is set in response to this low level signal.

On the other hand, to diagnose the vehicle speed meter 3, the inspector turns on and off the ignition switch three times. That is, the three ignition on-off signals are supplied to the input terminal IGN of a counter 81 and counted by the counter 81. When this counter 81 has counted three on-off signals, a flip-flop 83 is set. As described above, if these two flip-flops 79 and 83 are both set, the pseudo vehicle speed signal SS is applied to the cross coil meter 3 by way of an AND gate 85, the OR gate 27, the cross-coil driver 7 for providing diagnostic operation.

In summary, the cross coil meter 3 can be diagnosed by repeatedly turning the ignition switch on or off after the vehicle speed sensor 1 has been disconnected.

FIG. 7 is a fifth embodiment of the apparatus of the present invention, in which the diagnostic operation can be made by repeatedly shorting the two opened connector terminals 21a and 21b.

When the vehicle speed sensor 1 is disconnected by the connectors 21a and 21b, since a vehicle signal $V_{cc}$ is applied to the counter 87 via an OR gate 86, the counter 86 is released from the set mode, and starts counting the reference clock signal CK1. When this counter counts a predetermined number of clock signals, the n-th stage output $Q_n$ changes to a low level to set a flip-flop 89, so that an AND gate 91 is gated (activated). Under these conditions, the inspector repeatedly shorts the opened connector terminals 21a and 21b three times, for instance. Since the connector terminal 21a is connected to a supply vehicle $V_{cc}$ via a resistor 90, the signals generated by the above shorting operation are supplied to a counter 93 via an AND gate 91 and counted. When this counter 93 counts three short signals, the counter 93 generates an output to activate an AND gate 94, so that the pseudo vehicle speed signal SS can be supplied to the cross coil meter 3 via the AND gate 94, the OR gate 27 and the cross coil driver 7 for providing diagnostic operation.

In summary, the cross coil meter 3 can be diagnosed by repeatedly shorting the sensor connecting terminals 21a and 21b after the vehicle speed sensor 1 has been disconnected.

To describe the features of the embodiments together, in the first embodiment (FIGS. 2 and 3), the meter can be diagnosed on the basis of a pseudo signal when the vehicle sensor is disconnected and reconnected between $t_1$ and $t_2$ determined by counting the clock signal; in the second embodiment (FIG. 4), the meter can be diagnosed after $t_1$ in the same way; in the third embodiment (FIG. 5), the meter can be diagnosed on the basis of a pseudo signal (counter output signal) when a dc supply vehicle is applied to the terminal 21a after $t_1$; in the fourth embodiment (FIG. 6), the meter can be diagnosed on the basis of a pseudo signal when the ignition switch is turned on or off three times; in the fifth embodiment (FIG. 7), the meter can be diagnosed on the basis of a pseudo signal when the sensor terminals are shorted three times.

As described above, in the self-diagnostic apparatus for a vehicle meter according to the present invention, since a pseudo vehicle speed signal is applied to the vehicle meter only when a signal is applied to the apparatus a predetermined time after the apparatus has detected that the vehicle sensor had been disconnected from the meter and since the pseudo vehicle speed signal is not supplied when the ignition switch is turned on again, even if the vehicle sensor is disconnected by an accident during travelling, no pseudo vehicle speed signal is generated and therefore it is possible to prevent the driver from being confused by the fact that the pseudo vehicle speed different from the actual speed is indicated. In addition, it is possible to prevent the vehicle sensor from kept disconnected after the vehicle sensor has been inspected in the factory in the case of the first and second embodiments shown in FIGS. 2 and 4.

What is claimed is:

1. A self-diagnostic apparatus for diagnosing a meter actuated by a sensor mounted on an automotive vehicle,
    (a) detecting means for detecting a first sensor signal which is generated when the sensor is disconnected from the meter;
    (b) time measuring means, coupled to said detecting means, for measuring a predetermined time period after said detecting means has detected the first sensor signal; and
    (c) pseudo signal generating means, coupled to said detecting means and said time measuring means, for generating a pseudo sensor signal to diagnose the meter only when said detecting means detects a second sensor signal which is generated when the sensor is reconnected to the meter after said time measuring means has measured the predetermined time period.

2. The self-diagnostic apparatus of claim 1, wherein said detecting means detects the second sensor signal generated when a dc voltage is applied to the meter after the sensor has been disconnected from the meter.

3. The self-diagnostic apparatus of claim 1, which further comprises counter means, connected to said pseudo signal generating means, for generating the second sensor signal when an ignition switch is turned on 4. The self-diagnostic apparatus of claim 1, which further comprises counter means, connected to said pseudo signal generating means, for generating the second sensor signal when the meter is shorted repeatedly by a predetermined number of times after the sensor has been disconnected from the meter.

5. The self-diagnostic apparatus of claim 1, which further comprises another time measuring means, coupled between said time measuring means and said pseudo signal generating means, for measuring another predetermined time period after said time measuring means has measured the predetermined time period, said pseudo signal generating means generating the pseudo sensor signal to diagnose the meter only when said detecting means detects the second sensor signal after said time measuring means has measured the predetermined time period but before said another time measuring means does not measure the another predetermined time period.

6. The self-diagnostic apparatus of claim 2, wherein the pseudo sensor signal is an output signal of said time measuring means.

* * * * *